United States Patent
Frankovich

(10) Patent No.: US 7,789,584 B2
(45) Date of Patent: Sep. 7, 2010

(54) VEHICLE REAR END ADAPTER ASSEMBLY

(76) Inventor: Bernie Frankovich, 160 W. Division Rd., Valparaiso, IN (US) 46385

( * ) Notice: Subject to any disclaimer, the term of this patent is extended or adjusted under 35 U.S.C. 154(b) by 617 days.

(21) Appl. No.: 11/678,908

(22) Filed: Feb. 26, 2007

(65) Prior Publication Data

US 2007/0200371 A1 Aug. 30, 2007

Related U.S. Application Data

(60) Provisional application No. 60/743,352, filed on Feb. 24, 2006.

(51) Int. Cl.
*F16G 11/00* (2006.01)
(52) U.S. Cl. ...................................................... 403/299
(58) Field of Classification Search .................. 403/299
See application file for complete search history.

(56) References Cited

U.S. PATENT DOCUMENTS

| | | | | |
|---|---|---|---|---|
| 3,361,482 | A | * | 1/1968 | Stevens .................. 301/35.629 |
| 3,366,145 | A | * | 1/1968 | Lohn ............................ 138/39 |
| 3,678,962 | A | * | 7/1972 | Pierce, Jr. ..................... 138/39 |
| 3,716,992 | A | * | 2/1973 | Stahl ............................ 60/323 |
| 4,406,259 | A | * | 9/1983 | Van Etten ............... 123/198 R |
| 5,096,264 | A | * | 3/1992 | Hayashi ................. 301/64.202 |
| 6,354,408 | B1 | * | 3/2002 | Bailey et al. ............. 188/73.39 |
| 7,565,958 | B1 | * | 7/2009 | Dumas ........................ 192/3.29 |
| 2009/0023505 | A1 | * | 1/2009 | Poskie et al. ................. 464/147 |
| 2009/0078082 | A1 | * | 3/2009 | Poskie et al. .............. 74/606 R |

OTHER PUBLICATIONS

Subaru Differential Installation [online], Mar. 22, 2004 [retrieved on Sep. 15, 2009]. Retrieved from internet <http://www.triumphcars.com/current/fm70893u/subarudiff.htm>.*

* cited by examiner

*Primary Examiner*—Victor MacArthur
(74) *Attorney, Agent, or Firm*—Hartman & Hartman, P.C.; Gary M. Hartman; Domenica N. S. Hartman

(57) ABSTRACT

An adapter assembly for securing a rear end cover to an automobile differential housing. The adapter assembly includes an annular-shaped plate having an inner diameter, an outer diameter, and a thickness in a direction transverse to the inner and outer diameters, and at least two and preferably three sets of holes. A first set of holes is through the thickness of the plate and countersunk, and a second set of holes is threaded. The optional third set of holes also extend through the thickness of the plate. The assembly further includes at least two and preferably three sets of bolts. A first set of bolts is configured and sized to be received in the first set of holes so that their heads are entirely received in the countersink and their shafts protrude from the plate. A second set of bolts is configured and sized to be threaded into the second set of holes. The optional third set of bolts is configured and sized to be received in and extend entirely through the third set of holes so that their shafts protrude from the plate.

4 Claims, 2 Drawing Sheets

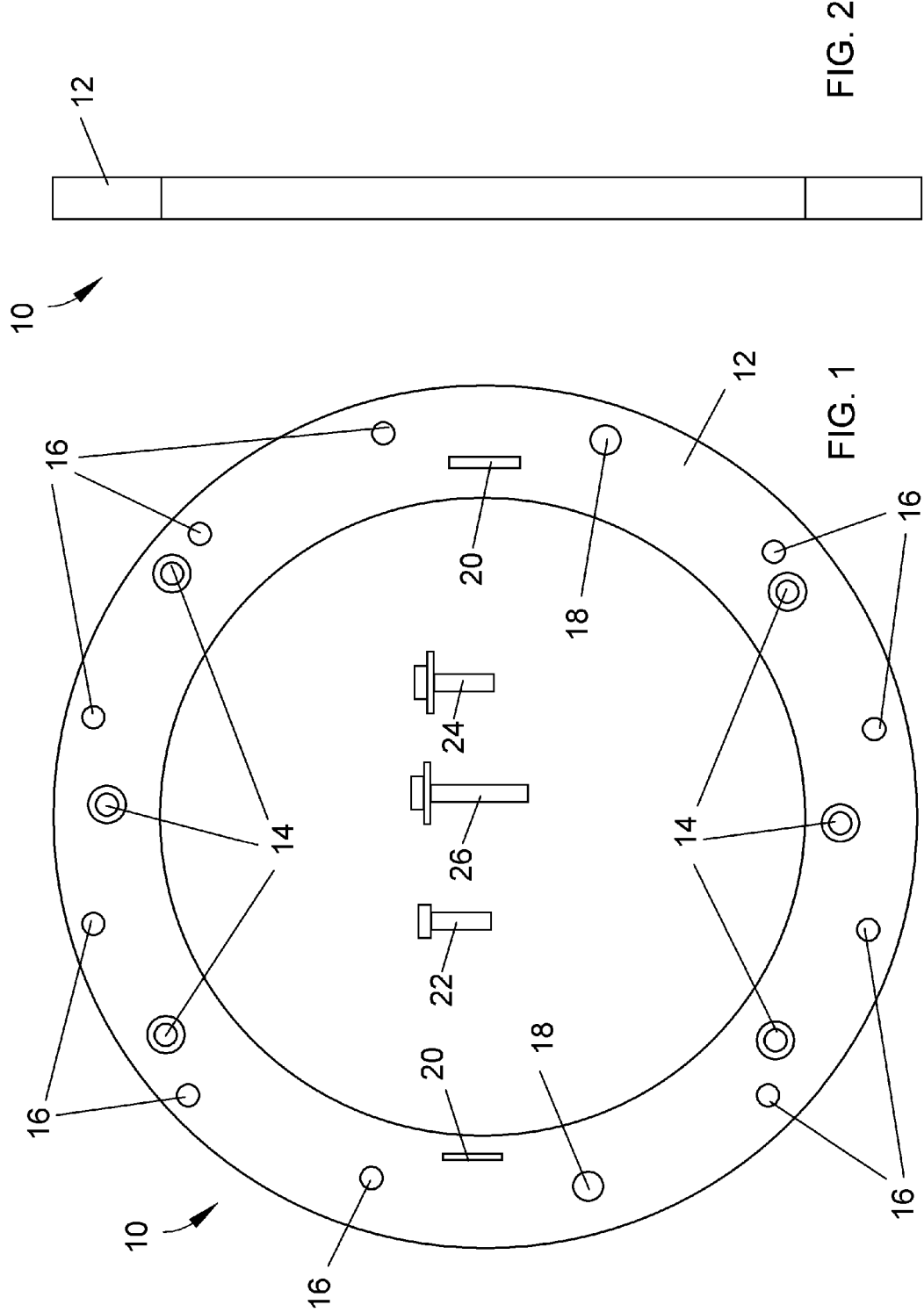

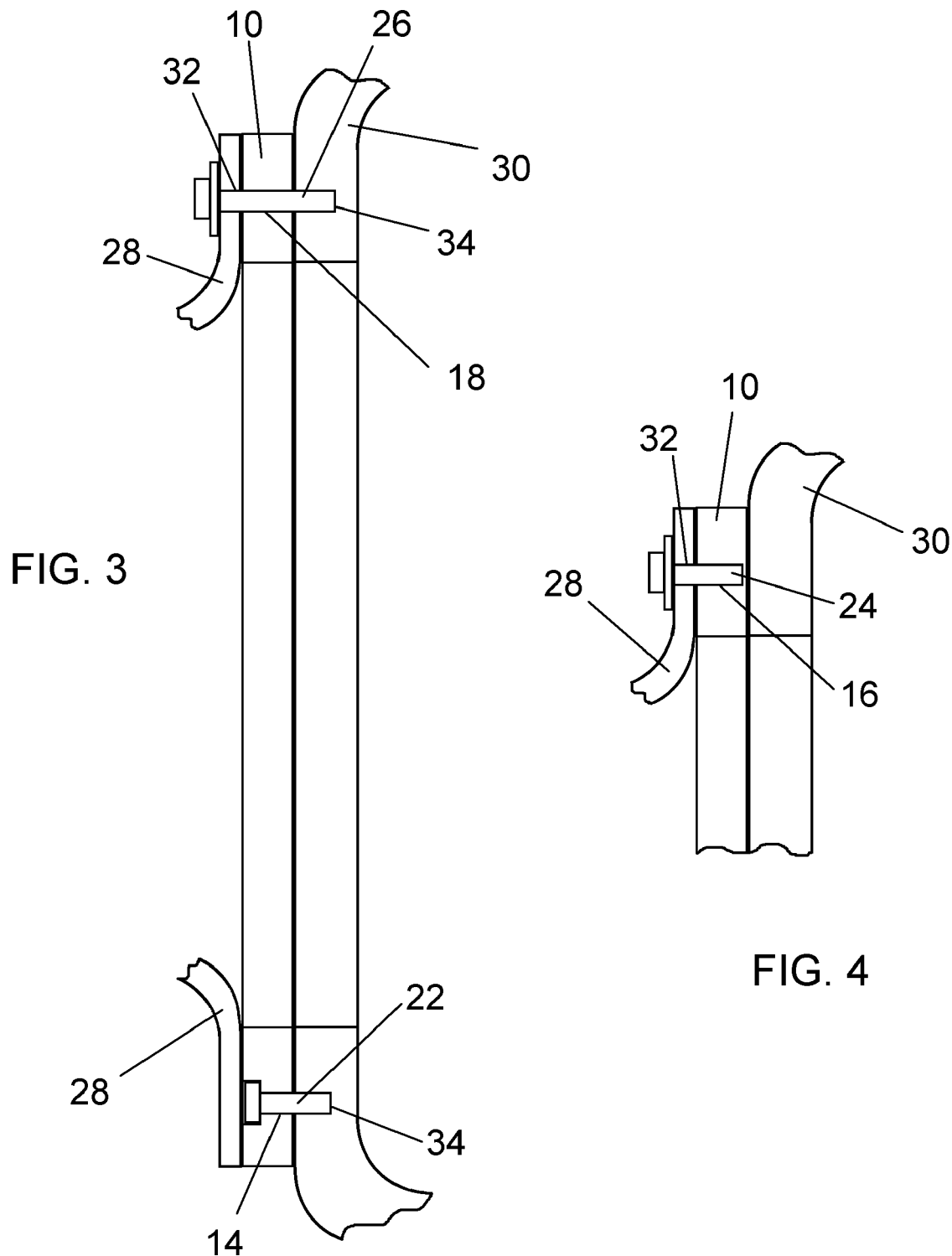

VEHICLE REAR END ADAPTER ASSEMBLY

CROSS REFERENCE TO RELATED APPLICATIONS

This application claims the benefit of U.S. Provisional Application No. 60/743,352, filed Feb. 24, 2006, the contents of which are incorporated herein by reference.

BACKGROUND OF THE INVENTION

The present invention generally relates to automotive hardware, and more particularly to rear differentials of rear wheel drive vehicles.

The differential of a rear wheel drive vehicle is contained in a housing, with access to the differential being through what is commonly termed a rear end cover. The rear end cover is typically secured to the differential housing with bolts. The size of the cover and the number of bolts is determined by the manufacturer. For example, certain vehicles manufactured by the General Motors Corporation, including the Chevrolet Camaro, Nova, Chevelle, etc., have been manufactured with differentials that have ten-bolt and/or twelve-bolt configurations. For aesthetic or other reasons, there may be a desire to secure a rear end cover to a differential housing having a different number of bolt holes and/or a different bolt hole pattern.

BRIEF SUMMARY OF THE INVENTION

The present invention provides an adapter assembly for securing a rear end cover to a differential housing of a rear wheel drive vehicle. The adapter assembly includes an annular-shaped plate having an inner diameter, an outer diameter, and a thickness in a direction transverse to the inner and outer diameters, and at least two and preferably three sets of holes. A first set of the holes is through the thickness of the plate and countersunk, and a second set of the holes is threaded. The optional third set of holes also extend through the thickness of the plate. The assembly further includes at least two and preferably three sets of bolts. A first set of the bolts is configured and sized to be received in the first set of the holes so that their heads are entirely received in the countersink and their shafts protrude from the plate. A second set of the bolts is configured and sized to be threaded into the second set of holes, and the optional third set of bolts is configured and sized to be received in and extend entirely through the third set of holes so that their shafts protrude from the plate.

As described above, the adapter assembly provides different holes and bolts that enable the plate to be secured to a differential housing having one type of bolt pattern, and enable a rear end cover with a different bolt pattern to be secured to the differential. In particular, the first sets of bolts and holes can be used to secure the plate to the differential housing, and the second and optional third sets of bolts and holes can be used to secure the rear end cover to the plate and, therefore, the differential housing.

Other objects and advantages of this invention will be better appreciated from the following detailed description.

BRIEF DESCRIPTION OF THE DRAWINGS

FIGS. 1 and 2 are plan and side views, respectively, of an adapter assembly in accordance with a preferred embodiment of this invention.

FIG. 3 is a cross-sectional view showing the mounting of a rear end cover to a differential housing in accordance with the invention.

FIG. 4 is a fragmentary cross-sectional view showing a different region of the mounted rear end cover of FIG. 3.

DETAILED DESCRIPTION OF THE INVENTION

An adapter assembly 10 is illustrated in FIGS. 1 and 2 for use in securing a rear end cover 28 to a differential housing 30, as represented in FIGS. 3 and 4. The assembly 10 is shown in FIGS. 1 and 2 as including an annular-shaped plate 12, three sets of holes 14, 16, and 18 through the thickness of the plate 12, and three sets of bolts 22, 24, and 26. In view of its annular shape, the plate 12 has inner and outer diameters whose dimensions will vary, depending on the particular application for the assembly 10. A suitable thickness for the plate 12 is about one-half inch (about 13 mm), though less and greater thicknesses are possible. A suitable material for the plate 12 is aluminum, though those skilled in the art will appreciate that other materials could be used. While three corresponding sets of holes 14, 16, and 18 and bolts 22, 24, and 26 are shown and described below, it should be understood that other numbers and combinations of holes and bolts could be employed to achieve the intended purpose of this invention.

The first set of holes 14 in the plate 12 extend entirely through the thickness of the plate 12. Each hole 14 is preferably unthreaded and countersunk, the latter of which is used in its conventional sense to mean an enlarged portion of a hole that allows a screw or bolt to be inserted flush or below a surface in which the countersink and hole are formed. The second set of holes 16 in the plate 12 are threaded and preferably extend entirely through the thickness of the plate 12. The third set of holes 18 are preferably unthreaded and extend entirely through the thickness of the plate 12. Suitable diameters for the holes 14, 16, and 18 will depend on the particular application for the assembly 10. For example, the holes 14, 16, and 18 can be sized and threaded, as appropriate, to accommodate 5/16 inch (about 7.9375 mm) bolts, which are a common size for differential housings.

The first set of bolts 22 are configured and sized to be received in the first set of holes 14 so that their heads are entirely received in the countersinks of the first set of holes 14 and their shafts protrude from the plate 12, enabling the bolts 22 to be threaded into threaded holes 34 in the differential housing 30, as shown in FIG. 3. A second set of the bolts 24 is configured and sized to be threaded into the second set of holes 16 in the plate 12, enabling the bolts 24 to be inserted through holes 32 in the rear end cover 28 and threaded into the plate holes 16 as shown in FIG. 4. A third set of the bolts 26 is configured and sized to be received in and extend entirely through additional holes 32 in the cover 28, entirely through the third set of holes 18 in the plate 12, and threaded into threaded holes 34 in the differential housing 30, as shown in FIG. 3. While a variety of bolt types could be used, the bolts 22, 24, and 26 are preferably stainless steel Allen head bolts. Though not shown, the bolts 22, 24, and 26 are preferably used with lock washers.

In the embodiment of the invention shown in FIGS. 1 through 4, the adapter assembly 10 is configured to mount a 12-bolt rear end cover 28 to a 10-bolt differential housing 30. The plate 12 is shown as having six of the first set of holes 14, ten of the second set of holes 16, and two of the third set of holes 18, and the rear end cover 28 has twelve holes 32 aligned with the holes 16, and 18 of the plate 12. The holes 14 and 18 in the plate 12 are aligned with eight of the ten threaded holes 34 in the differential housing 30. The plate 12 can be fabricated to have two additional holes 14 and/or 18 for alignment with the remaining two threaded holes 34 of the housing 30. The total number of holes 14 and 18 in the plate 12 do not need to equal the number of threaded holes 34 in the housing 34, but are only required in a sufficient number to reliably secure the plate 12 to the housing 30.

Those skilled in the art will appreciate that the number, angular spacing, and radial locations of the holes 14, 16, and 18 in the plate 12 are determined by the number, angular spacing, and radial locations of the threaded holes 34 in the differential housing 30 and the holes 32 of the rear end cover 28, such that the invention is not limited to the number, angular spacing, and radial locations shown in the Figures. However, FIG. 1 is intended to show the angular spacing and radial locations of the holes 14, 16, 18 proportional to a prototype adapter plate 12 that was fabricated and installed. The prototype plate 12 was fabricated from a 12×12×0.5 inch (about 30×30×13 cm) aluminum plate cut to have an outer diameter of about 11.25 inch (about 28.6 cm) and an inner diameter of about 8.75 inch (about 22.2 cm). The locations of the holes 14, 16, and 18 in the prototype plate 12 were located with the use of rear end gaskets for 10-bolt and 12-bolt rear ends manufactured by the General Motors Corporation. The locations of the holes 14 and 18 in the prototype plate 12 were located with the 10-bolt gasket, and the locations for the holes 16 were ascertained by aligning two holes of the 12-bolt gasket with the holes 18 in the plate 12 and then using the remaining holes of the 12-bolt gasket to locate the holes 16. The unthreaded holes 14 and 18 were drilled with a ⅜ inch (about 9.525 mm) drill bit, and the holes 14 were countersunk. The threaded holes 16 were drilled with a ¼ inch (about 6.35 mm) and then tapped for 5/16 inch (about 7.9375 mm) bolts.

While the invention has been described in terms of preferred and specific embodiments, it is apparent that other forms could be adopted by one skilled in the art. For example, the physical configuration of the plate 12 could differ from that shown, and materials and processes other than those noted could be use. Therefore, the scope of the invention is to be limited only by the following claims.

The invention claimed is:

1. An adapter assembly securing a rear end cover having a plurality of holes to an automobile differential housing having a plurality of threaded holes that differ in number from the holes of the rear end cover, the adapter assembly comprising:
   an annular-shaped plate having an inner diameter, an outer diameter, and a thickness in a direction transverse to the inner and outer diameters and between oppositely-disposed first and second surfaces of the plate;
   a first set of holes through the thickness of the plate, each hole of the first set of holes being unthreaded and countersunk in the first surface of the plate;
   a second set of holes in the first surface of the plate, each hole of the second set of holes being threaded;
   a third set of holes through the thickness of the plate, each hole of the third set of holes being unthreaded;
   a first set of bolts received in the first set of holes in the plate so that the heads of the first set of bolts are entirely received in the countersinks of the first set of holes and the shafts of the first set of bolts protrude from the second surface of the plate and are threaded into a first set of the threaded holes of the automobile differential housing so as to secure the plate to the automobile differential housing;
   a second set of bolts passing through a first set of the plurality of holes of the rear end cover and threaded into the second set of holes in the plate without protruding from the second surface of the plate so as to secure the rear end cover to the plate; and
   a third set of bolts received in and extending entirely through a second set of the plurality of holes of the rear end cover, extending entirely through the third set of holes of the plate, and threaded into a second set of the threaded holes of the automobile differential housing so as to secure the rear end cover and the plate to the automobile differential housing;
   wherein the sum of the first and third sets of holes is equal to or less than the number of the threaded holes of the automobile differential housing.

2. The adapter assembly according to claim 1, wherein the second set of holes extend through the thickness of the plate.

3. The adapter assembly according to claim 1, wherein the plate has six of the first set of holes, ten of the second set of holes, and two of the third set of holes, and the rear end cover has twelve of the plurality of holes therein.

4. The adapter assembly according to claim 1, wherein the sum of the first and third sets of holes is less than the number of the threaded holes of the automobile differential housing.

* * * * *